US009620751B2

(12) United States Patent
Kim et al.

(10) Patent No.: US 9,620,751 B2
(45) Date of Patent: Apr. 11, 2017

(54) DUAL SEALING CAP ASSEMBLY AND CYLINDRICAL SECONDARY BATTERY INCLUDING THE SAME

(75) Inventors: Sung Jong Kim, Daejeon (KR); Je Jun Lee, Daejeon (KR); Cha Hun Ku, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 12/872,299

(22) Filed: Aug. 31, 2010

(65) Prior Publication Data
US 2011/0076527 A1 Mar. 31, 2011

Related U.S. Application Data

(63) Continuation of application No. PCT/KR2010/003475, filed on May 31, 2010.

(30) Foreign Application Priority Data

Sep. 30, 2009 (KR) ........................ 10-2009-0093428

(51) Int. Cl.
*H01M 2/12* (2006.01)
*H01M 2/04* (2006.01)
*H01M 2/34* (2006.01)

(52) U.S. Cl.
CPC ....... *H01M 2/1241* (2013.01); *H01M 2/0413* (2013.01); *H01M 2/34* (2013.01);
(Continued)

(58) Field of Classification Search
CPC .... H01M 2/0413; H01M 2/1241; H01M 2/34; H01M 2200/00; H01M 2200/106
(Continued)

(56) References Cited

U.S. PATENT DOCUMENTS 5,853,912 A * 12/1998 Naing et al. .................... 429/61
2001/0046620 A1 11/2001 Inoue et al.
(Continued)

FOREIGN PATENT DOCUMENTS

CN 1784798 A 6/2006
JP 06-196140 A 7/1994
(Continued)

OTHER PUBLICATIONS

International Search Report issued on Jan. 26, 2011 for International Application No. PCT/KR2010/003475.
(Continued)

*Primary Examiner* — Stephen Yanchuk
(74) *Attorney, Agent, or Firm* — Birch, Stewart, Kolasch & Birch, LLP

(57) ABSTRACT

The present invention relates to a cap assembly and a battery including the same. More particularly, the present invention relates to a cap assembly for a cylindrical secondary battery, in which the support unit of a current interrupt device (CID) is seated in the inclined portion or the terraced portion of a gasket and thus the battery is dually sealed, thereby preventing the leakage of an electrolyte, and a cylindrical secondary battery including the cylindrical secondary battery. The cap assembly of the present invention is dually sealed for the leakage of an electrolyte. Accordingly, there is an advantage in that the safety of the battery can be greatly improved because the electrolyte is rarely leaked although the battery is shocked because of dropping.

11 Claims, 10 Drawing Sheets

(52) U.S. Cl.
CPC .. *H01M 2200/00* (2013.01); *H01M 2200/106* (2013.01); *H01M 2200/20* (2013.01)

(58) Field of Classification Search
USPC .................................................. 429/163–187
See application file for complete search history.

(56) References Cited

U.S. PATENT DOCUMENTS

| | | | |
|---|---|---|---|
| 2005/0048365 A1 | 3/2005 | Miyahisa et al. | |
| 2006/0078787 A1 | 4/2006 | Sato et al. | |
| 2007/0212595 A1 | 9/2007 | Kim et al. | |
| 2008/0038628 A1* | 2/2008 | Yamauchi et al. | 429/56 |
| 2009/0011329 A1 | 1/2009 | Yoon | |
| 2010/0015508 A1* | 1/2010 | Hwang | 429/56 |
| 2010/0077603 A1* | 4/2010 | Yamashita | H01M 2/0413 29/623.2 |
| 2010/0136388 A1* | 6/2010 | Kim | H01M 2/1241 429/56 |
| 2010/0215997 A1* | 8/2010 | Byun et al. | 429/61 |

FOREIGN PATENT DOCUMENTS

| | | |
|---|---|---|
| JP | 2701375 B2 | 1/1998 |
| JP | 2005-100927 A | 4/2005 |
| JP | 2006-286561 A | 10/2006 |
| KR | 10-2008-0109949 A | 12/2008 |
| KR | 10-0882915 B1 | 2/2009 |
| KR | 10-0973423 B1 | 8/2010 |
| TW | 494594 B | 7/2002 |
| TW | 535312 B | 6/2003 |
| WO | WO 2008/069476 A1 | 6/2008 |

OTHER PUBLICATIONS

Korean Notice of Allowance dated Jul. 29, 2011 for Korean Application No. 10-2009-0093428.

* cited by examiner

Prior Art

410a

412a

DUAL SEALING CAP ASSEMBLY AND CYLINDRICAL SECONDARY BATTERY INCLUDING THE SAME

CROSS REFERENCE TO RELATED APPLICATIONS

This application is a Continuation of PCT International Application No. PCT/KR2010/003475 filed on May 31, 2010, which claims priority under 35 U.S.C. 119(a) to Patent Application No. 10-2009-0093428 filed in Republic of Korea, on Sep. 30, 2009, all of which are hereby expressly incorporated by reference into the present application.

BACKGROUND OF THE INVENTION

Field of the Invention

The present invention relates to a cap assembly and a battery including the same and, more particularly, to a cap assembly for a cylindrical secondary battery, in which the support unit of a current interrupt device (CID) is seated in the inclined portion or the terraced portion of a gasket and thus the battery is dually sealed, thereby preventing the leakage of an electrolyte, and a cylindrical secondary battery including the cylindrical secondary battery.

Discussion of the Related Art

A secondary battery is classified into a cylindrical battery and an angular battery in which an electrode assembly is embedded in a cylindrical or angular metal can and a pouch type battery in which an electrode assembly is embedded in the pouch type casing of an aluminum laminate sheet, depending on the shape of the battery casing.

Further, the electrode assembly built in the battery casing is an electric generation device is configured to have a stack structure of a positive electrode, a separation film, and a negative electrode and can be charged and discharged. The electrode assembly is classified into a jelly-roll type structure in which the positive electrode and the negative electrode of a long sheet type, coated with an active material, are wound with the separation film interposed therebetween and a stack type structure in which the plurality of positive electrodes and the plurality of negative electrodes, having a specific size, are sequentially stacked with the separation film interposed therebetween. From among them, the electrode assembly of the jelly-roll type structure is most widely used because it is advantageous in terms of easy manufacture and a high energy density per weight. The electrode assembly of the jelly-roll type structure is chiefly used for the cylindrical battery.

However, the electrode assembly of the jelly-roll type structure is likely to be deformed while experiencing repetitive expansion and contraction when the battery is charged and discharged. In this process, stress is concentrated on a central portion of the electrode assembly, and so the electrode penetrates the separation film and then brings into contact with a metal center pin, thereby causing an internal short. An organic solvent can be decomposed because of heat generated by the internal short and generate gas, and the battery can be exploded because of a rise in the gas pressure within the battery. Such a rise in the gas pressure within the battery can occur even when an internal short is generated by an external impact.

In order to solve the safety problem of the battery, safety elements, such as a safety vent for exhausting a high-pressure gas, a positive temperature coefficient (hereinafter referred to as a 'PTC') element for interrupting current at high temperature, and a current interrupt device (hereinafter referred to as a 'CID') for interrupting current when an internal pressure within the battery rises, and a top cap forming a projection type terminal for protecting the elements are fixed by a gasket within the cap assembly of the cylindrical battery.

The cap assembly is configured to prevent an electrolyte within the battery from fundamentally leaking externally in such a manner that the gasket surrounds the outer circumference, including the safety vent, the PTC element, the CID, and the top cap. Accordingly, if the electrolyte is not leaked through an interface of the safety vent placed on the innermost side of the battery and the gasket configured to surround the outer circumference of the safety vent, the electrolyte is not leaked through interfaces between metal materials, such as the interface of the safety vent and the PTC element and the interface of the PTC element and the top cap.

However, some of the electrolyte is substantially leaked through the interface of the gasket and the safety vent in a process of charging and discharging the battery, because of dropping and an external impact, and so on. There is a problem in that the electrolyte can be easily leaked externally through the interfaces between the metal materials. That is, the interface between the metal materials is relatively low in the adhesion strength. Accordingly, the electrolyte once introduced into the interface between the metal materials can easily leak externally as compared with the interface between the gasket and its pertinent elements.

Accordingly, there is a great need for a technique capable of reducing a phenomenon in which the electrolyte is leaked from the cap assembly.

In line with the necessity, Japanese Unexamined Patent Application Publication No. 2006-286561, Japanese Unexamined Patent Application Publication No. 2005-100927, Japanese Unexamined Patent Application Publication No. 2002-373711, etc. disclose a cap assembly having a gasket provided under a top cap. However, the cap assembly disclosed in the patent application publications is difficult to manufacture because the gasket to surround and seal the outer circumference of safety devices has a complicated shape and does not fundamentally solve the above problems because an electrolyte is leaked from the interface between the metal materials (the safety vent, the PTC element, and the top cap).

FIG. 1 is a cross-sectional view showing the upper structure of a conventional cylindrical secondary battery.

Referring to FIG. 1, the battery 100 is fabricated by inserting an electrode assembly 300 (i.e., an electric generation device) into a can 200, injecting an electrolyte into the can 200, and mounting a cap assembly 400 on the upper opening of the can 200.

The cap assembly 400 includes a top cap 410, a PTC element 420 for interrupting overcurrent, and a safety vent 430 for lowering an internal pressure. The top cap 410, the PTC element 420, and the safety vent 430 are closely adhered and disposed within a gasket 500 configured to maintain airtightness and mounted on the upper beading unit 210 of the can 200.

The top cap 410 has a central portion projected upward and functions as a positive electrode terminal through a contact with an external circuit. A plurality of penetration holes (not shown) for exhausting gas is perforated in the top cap 410. The safety vent 430 has its bottom connected to the positive electrode of the electrode assembly 300 via a current interruption safety device 440 and a positive electrode lead 310.

The safety vent 430 is made of a thin conductive sheet material. A downward indentation portion 432 is formed in a central portion of the safety vent 430, and two notches with different depths are formed at the upper curved portion and the lower curved portion of the downward indentation portion 432.

The current interruption safety device 440 is disposed under the safety vent 430 made of the conductive sheet material and it functions to interrupt current when pressure within the battery is higher than a critical value. The current interruption safety device 440 preferably is made of the same material as the safety vent 430. An auxiliary gasket 510 is made of polypropylene (PP)-based materials so that it can prevent the current interruption safety device 440 and the safety vent 430 from becoming electrified.

For example, when a temperature of the battery 100 rises because of an internal short, overcharge, etc. caused by various causes, the amount of electrified current is greatly reduced by an increase in the resistance of the PTC element 420. If the electrolyte is decomposed by a continued rise in the temperature, thus generating gas, and resultantly an internal pressure rises, the downward indentation portion 432 of the safety vent 430 is raised up and the current interruption safety device 440 is partially ruptured to interrupt current, thereby guaranteeing safety. If the pressure continues to rise, the notches 436 of the safety vent 430 are ruptured and so a high-pressure gas is exhausted outside the battery 100 in order to guarantee safety.

SUMMARY OF THE INVENTION

Accordingly, the present invention has been made keeping in mind the above problems occurring in the prior art.

The inventors of the present application, as a result of depth research and various experiments, have found that the safety of a battery can be greatly improved if a safety vent and a CID are fixed together in a fitting state and the CID is seated in the inclined portion or the terraced portion of a gasket so that the CID can be additionally fixed between the safety vent and the gasket and thus have completed the present invention.

In accordance with an aspect of the present invention, there is provided a cap assembly, comprising a top cap configured to include gas exhaust holes and form a projection terminal; a safety vent formed of a circular metal sheet and configured to have a projection portion formed at a center and two or more notches formed on a concentric circle around the projection portion; a current interrupt device (CID) formed of a circular metal sheet and configured to have gas exhaust holes, a central portion bonded with the projection portion of the safety vent and formed at a center, an activator having notches formed on a concentric circle around the central portion of the CID, and a support unit having an external diameter greater than a diameter of the activator and having a ring shape over the activator; and a gasket configured to have an inclined portion or a terraced portion and to surround and seal an outer circumference of the constituent elements. The safety vent and the CID are fixed together in a fitting state with an auxiliary gasket interposed therebetween. The support unit of the CID is seated in the inclined portion or the terraced portion of the gasket, thereby additionally fixing the CID between the safety vent and the gasket. The bonding strength between an indentation central portion of the safety vent and the projection portion of the CID is greater than the rupture strength of each of all the notches formed in the safety vent and the CID.

Further, in the present invention, the safety vent comprises a Z-shaped projected fitting unit, the CID comprises engagement units between the activator and the support unit, and the Z-shaped projected fitting unit of the safety vent and the engagement units of the CID are fitted and fixed together with the auxiliary gasket interposed therebetween.

Further, in the present invention, the fitting state includes a forced fitting state.

Further, in the present invention, the place where the support unit of the CID is seated in the gasket is within an area of a beading unit.

Further, in the present invention, the gas exhaust holes of the top cap and the gas exhaust holes of the CID are provided in an identical location from a viewpoint of an axial direction.

Further, in the present invention, the cap assembly further comprises a positive temperature coefficient (PTC) element between the top cap and the safety vent.

Further, in the present invention, the support unit of the CID is seated in the inclined portion or the terraced portion of the gasket and so a battery is dually sealed for a leakage of an electrolyte.

Further, the present invention provides a cylindrical secondary battery comprising the cap assembly.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

The cap assembly of the present invention comprises a top cap configured to include gas exhaust holes and form a projection terminal; a safety vent formed of a circular metal sheet and configured to have a projection portion formed at its center and two or more notches formed on the concentric circle around the projection portion; a current interrupt device (CID) formed of a circular metal sheet and configured to have gas exhaust holes, a central portion bonded with the projection portion of the safety vent and formed at its center, an activator having notches formed on the concentric circle around the central portion of the CID, and a support unit having an external diameter greater than the diameter of the activator and having a ring shape over the activator; and a gasket configured to have an inclined portion or a terraced portion and to surround and seal the outer circumference of the constituent elements.

The safety vent and the CID are fixed together in a fitting state with an auxiliary gasket interposed therebetween. The support unit of the CID is seated in the inclined portion or the terraced portion of the gasket, thereby additionally fixing the CID between the safety vent and the gasket. The bonding strength between the indentation central portion of the safety vent and the projection portion of the CID is greater than the rupture strength of each of all the notches formed in the safety vent and the CID.

In the present invention, the safety vent and the CID are fixed together in a fitting state with the auxiliary gasket interposed therebetween.

In general, the CID is fixed to the safety vent and provided in the assembly. The central portion of the CID is welded to the projection portion of the safety vent and bonded thereto. However, the problem is that if the battery is shocked because of causes, such as dropping, a short can occur at the shocked portion of the battery. If the CID is separated from the safety vent, the CID can freely move within the battery. Accordingly, there is a danger that the CID can generate a short of the battery.

Accordingly, in order to stably fix and couple the CID and the safety vent, the safety vent and the CID are fixed in a fitting state.

Figure 3:
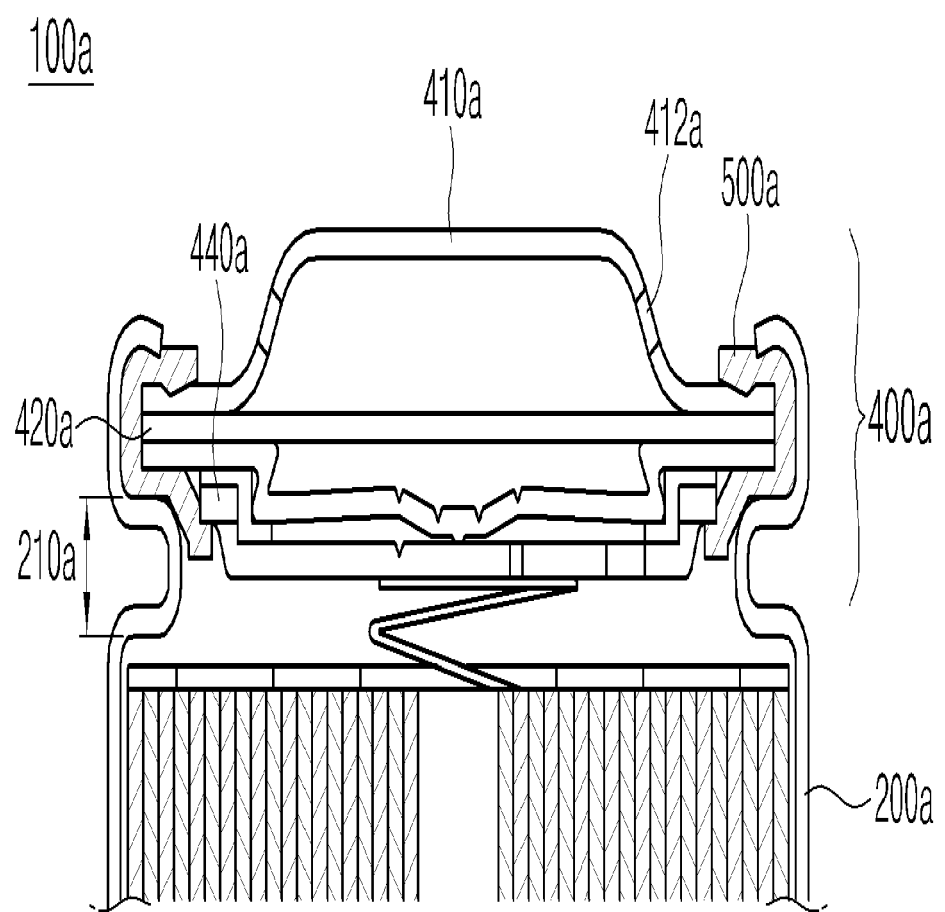
FIG. 3 is a diagram showing the structure of a cap assembly according to another embodiment of the present invention.
Figure 7:
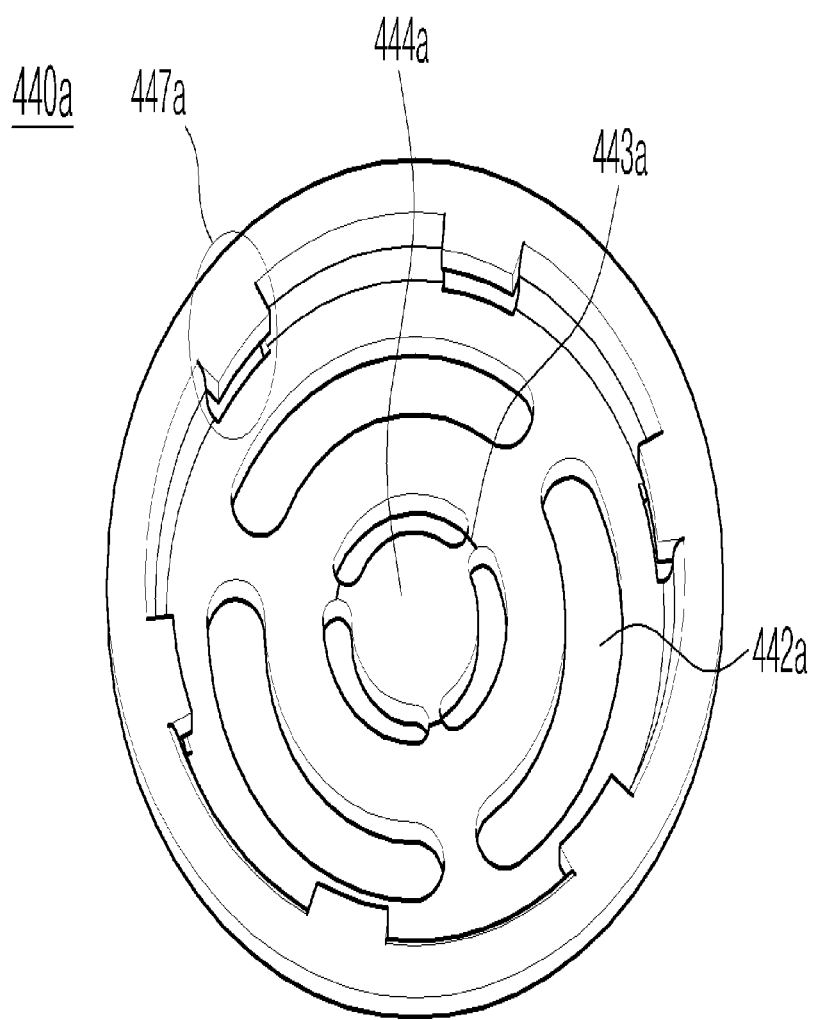
FIG. 7 is a perspective view of a CID which is one of the elements of the cap assembly according to the present invention.
Figure 8:
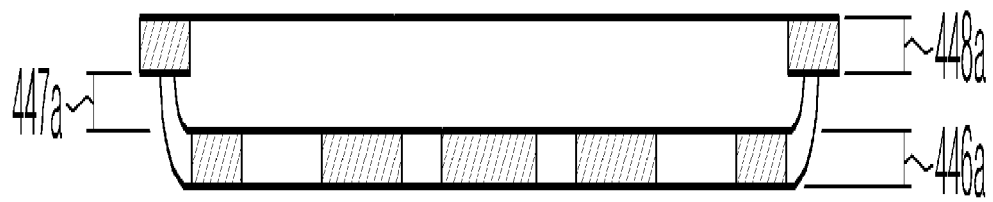
FIG. 8 is a cross-sectional view of the CID which is one of the elements of the cap assembly according to the present invention.

The safety vent can include a Z-shaped projected fitting unit, as shown in FIG. 3, and the CID can include engagement units between the activator and the support unit, as shown in FIGS. 7 and 8. Each of the engagement units can include a hole in which the fitting unit of the safety vent can be seated and a latch functioning to fix the auxiliary gasket and the fitting unit to the hole. The fitting unit of the safety vent and the engagement unit of the CID preferably are fitted together and fixed with the auxiliary gasket interposed therebetween. In particular, it is more preferred that the fitting state be a forced fitting state so that the CID can be more robustly fixed. The term 'forced fitting' refers to the degree of tolerance between an inserted portion (for example, a shaft) and a mated portion (for example, a hole). The term 'forced fitting' is widely used in the design of a machine, and the definition 'forced fitting' in the present specification follows the design of a machine which is commonly widely used.

In the present invention, the CID includes the support unit, and the support unit of the CID is seated in the inclined portion or the terraced portion of the gasket. Accordingly, the CID can be further fixed between the safety vent and the gasket.

The inclined portion of the gasket can be naturally formed when the gasket is clamped. When the gasket, together with the can, is clamped as in FIG. 3, part of the gasket is put over the beading unit, and the remaining of the gasket is protruded into the inside of the can. Here, the gasket is bent at a specific angle in the direction of gravity and thus the inclined portion of the gasket can be formed.

Meanwhile, when the support unit of the CID is seated in the inclined portion of the gasket and pressure is applied between the support unit of the CID and the gasket in a process of the gasket being clamped, part of the gasket is pushed and thus the terraced portion of the gasket may be naturally formed. If in the clamping process, pressure is not applied between the support unit of the CID and the gasket, the support unit of the CID may be placed in the inclined portion of the gasket with it seated therein.

In addition to the above method, a method of forming a predetermined inclined portion or terraced portion in the gasket can be also used. In other words, a terraced portion may be formed in the gasket in such a way as to artificially dig a groove in the gasket in addition to a special process.

When the CID is additionally fixed as described above, there is an advantage in that the CID can be more robustly supported when the battery is shocked by causes, such as dropping. In other words, in a conventional battery structure, the CID is simply welded and fixed to the safety vent. In the assembly of the present invention, although the battery is shocked, safety is high because the CID is fixed to the safety vent in a fitting state. In particular, even in the case in which a bonding portion between the CID and the safety vent is separated because of an impact applied to the battery, the CID is closely fixed to the safety vent. Accordingly, safety is very high as compared with the conventional battery structure.

Furthermore, since the support unit of the CID is seated in the inclined portion or the terraced portion of the gasket, there is an advantage in that the battery is dually sealed for the leakage of an electrolyte.

In a normal state or normal operation condition of the battery, the electrolyte within the battery does not flow in the interface. However, when external force is applied or an internal pressure rises, the sealing state of the cap assembly can be released partially or temporarily, and thus the electrolyte can flow in the interface. When the electrolyte within the battery flows in the interface between the bottom surface of the safety vent and the gasket, the electrolyte easily passes through the interface between a PTC element and the safety vent having relatively low adhesion strength or the interface between the PTC element and the top cap and then leaks.

Figure 10:
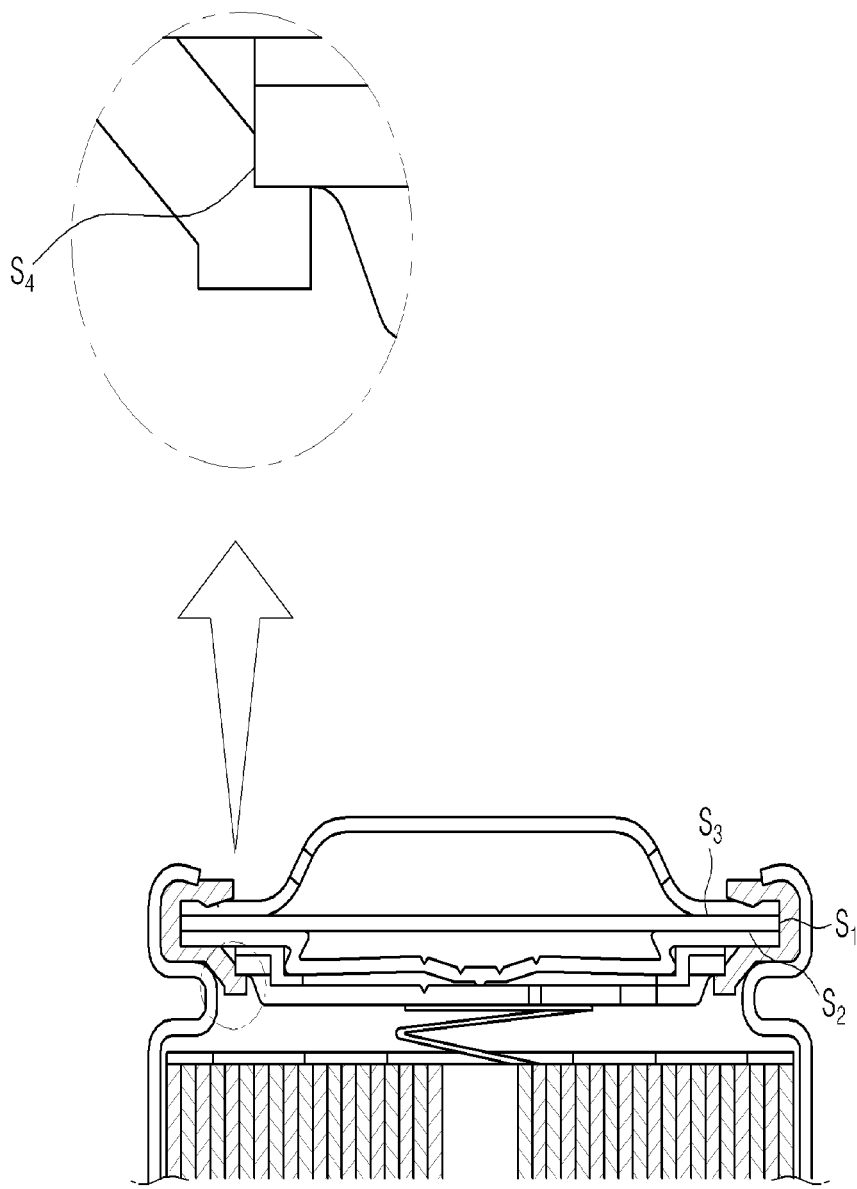
FIG. 10 is a diagram showing that the cap assembly of the present invention is dually sealed.

In the assembly structure of the present invention, however, as shown in FIG. 10, the electrolyte must pass through the interface between the CID and the gasket before it is exposed to the interface between the safety vent and the gasket. Accordingly, a higher sealing strength can be provided.

Figure 2:
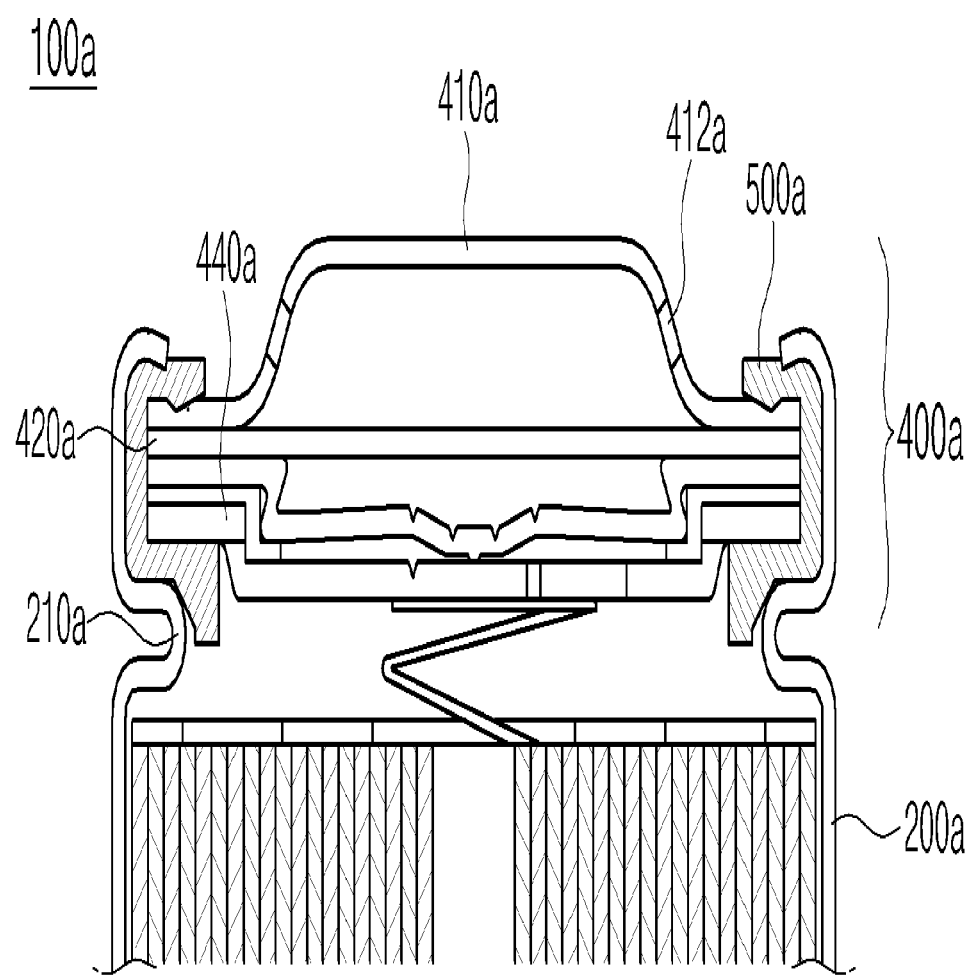
FIG. 2 is a diagram showing the structure of a cap assembly according to an embodiment of the present invention.

In particular, it is preferred that a place where the support unit of the CID is seated in the gasket be within the area of the beading unit. In the present invention, however, the place where the support unit of the CID is seated in the gasket is not specially limited. In order to support the CID, the support unit of the CID can be extended in the same length as the remaining elements, such as the safety vent, as shown in FIG. 2, and can have the same outer circumference as the remaining elements. In this case, the thickness of the assembly is increased, and the volume of an electrode assembly is reduced as much as the increment. Accordingly, such a method is not preferred because the capacity of the battery may be reduced. For this reason, it is preferred that the place where the support unit of the CID is seated in the gasket be within the area of the beading unit, as shown in FIG. 3.

In the present invention, the bonding strength between the indentation central portion of the safety vent and the projection portion of the CID should be greater than the rupture strength of each of all the notches formed in the safety vent and the CID. This is because the bonding of the indentation central portion of the safety vent and the projection portion of the CID should not be untied at least until the notch of the safety vent is ruptured and opened. If the bonding is untied before the notch of the safety vent is ruptured, there is a danger that the current interruption effect of the CID member may not be generated. Accordingly, it is better that the bonding strength between the indentation central portion of the safety vent and the projection portion of the CID is stronger, and the upper limit of the bonding strength is not limited. In this respect, the present invention significantly differs from the prior art in which the welding between the safety vent and other elements, such as a lead sheet, is untied in a specific pressure.

In the present invention, it is preferred that gas exhaust holes provided in the top cap and gas exhaust holes provided in the CID be provided in the same location from a viewpoint of an axial direction. When the gas exhaust holes are formed in the same location, generated gas can be exhausted without a curved path, and so the safety of the battery can be increased.

In the present invention, the PTC element can be further included between the top cap and the safety vent. Although the PTC element is in general interposed between the top cap and the safety vent, the PTC element may not necessarily interposed between the top cap and the safety vent. The PTC element has its resistance greatly rising when temperature of the battery rises, thus interrupting current. The PTC element is widely known in the art to which the present invention pertains, and a further description thereof is omitted. In the present invention, a conventional PTC element can be used without limitation.

Hereinafter, some embodiments of the present invention are described in more detail with reference to the accompanying drawings. The embodiments are provided to help understand the present invention and are not intended to limit the scope of the present invention thereto.

FIG. 3 shows the structure of a cap assembly according to an embodiment of the present invention.

Referring to FIG. 3, the cap assembly 400a includes the top cap 410a within the gasket 500a configured to maintain airtightness and mounted on the upper beading unit 210a of the can 200a, the PTC element 420a for current interruption, the safety vent for dropping internal pressure, and the CID 440a which are closed together. The cylindrical secondary battery 100a can be fabricated by inserting the electrode assembly into the can 200a, injecting the electrolyte the can 200a, and mounting the cap assembly 400a on the top open end of the can 200a.

Figure 4:
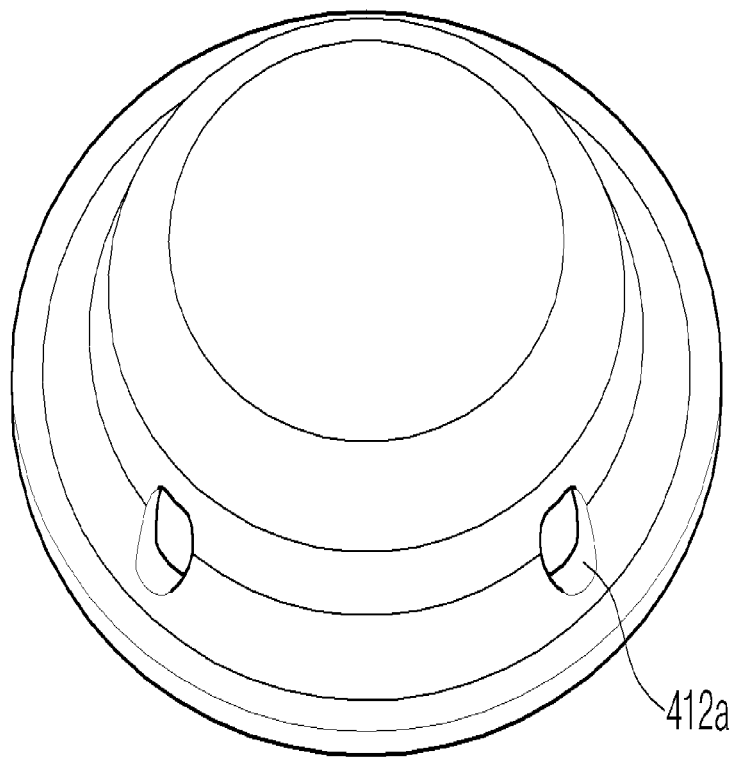
FIG. 4 is a diagram showing a top cap which is one of the elements of the cap assembly according to the present invention.

FIG. 4 is a diagram showing the top cap which is one of the elements of the cap assembly according to the present invention.

The top cap 410a has its central portion upwardly protruded and functions as a positive electrode terminal through a connection with an external circuit. The plurality of gas exhaust holes 412a to exhaust compressed gas is formed along the protruded circumference of the top cap 410a within the can 200a.

Figure 5:
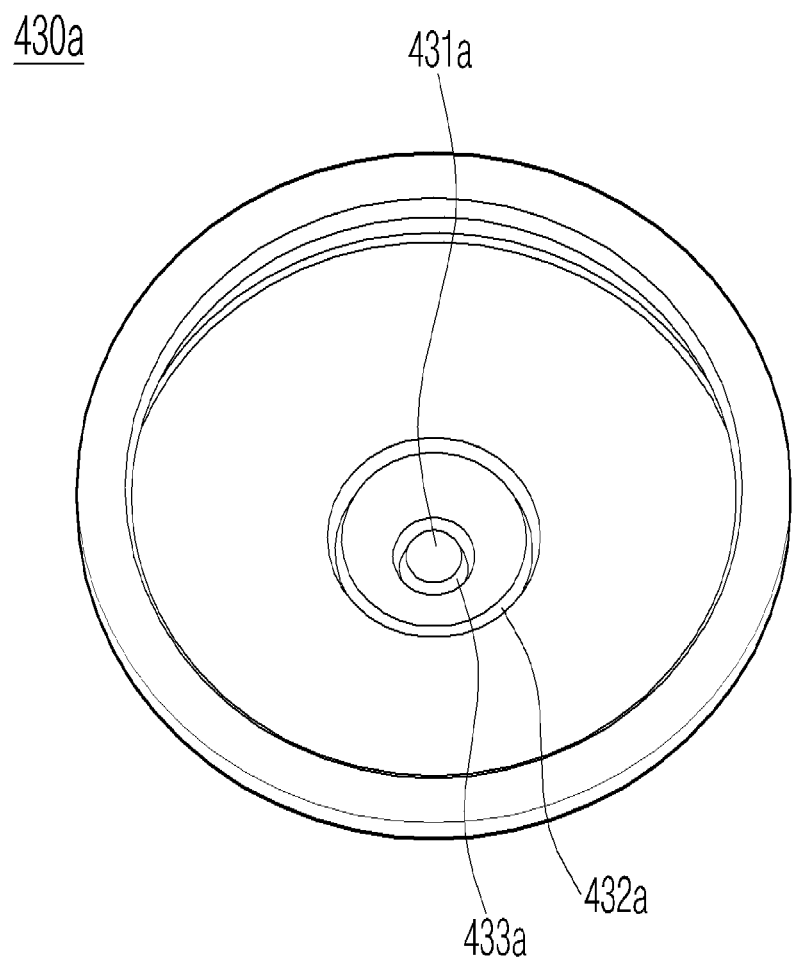
FIG. 5 is a perspective view of a safety vent which is one of the elements of the cap assembly according to the present invention.
Figure 6:
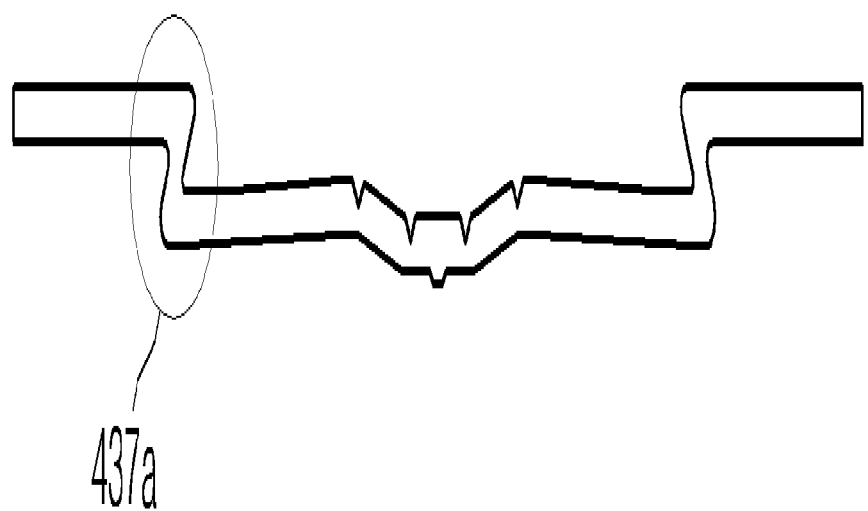
FIG. 6 is a cross-sectional view of the safety vent which is one of the elements of the cap assembly according to the present invention.

FIGS. 5 and 6 show the safety vent which is one of the elements of the cap assembly according to the present invention.

The safety vent 430a is a thin film structure of a circular sheet form through which current can flow. The notches 432a and 433a are formed in the safety vent 430a. The notches 432a and 433a form an upper curved portion and a lower curved portion. The upper curved portion and the lower curved portion are composed of the two notches 432a and 433a with different depths. Further, the center of the upper curved portion and the lower curved portion is depressed to form the projection portion 431a. The center of the upper curved portion and the lower curved portion is bonded with the central portion 444a of the CID 440a.

As shown in FIGS. 3, 5, and 6, in the safety vent 430a, the first notch 432a formed on the upper side of the notches 432a and 433a has a closed curve structure, and the second notch 433a formed on the lower side of the notches 432a and 433a has an open curve structure part of which is opened. This is for the purpose of preventing the projection portion 431a from being fully separated from the safety vent 430a when the second notch 433a is ruptured by internal pressure. If the projection portion 431a is fully separated from the safety vent 430a, it can freely move within the battery and cause to generate a short. Further, since the bonding strength of the second notch 433a is smaller than the bonding strength of the first notch 432a, the second notch 433a is dug deeper than the first notch 432a.

When the internal pressure of the can 200a is higher than a critical pressure, the safety vent 430a is upward deformed by the notches 432a and 433a formed therein. In this case, the projection portion 431a is lifted up, and the central portion 444a of the CID 440a, bonded to the bottom of the safety vent 430a, is separated from the main body of the CID. Accordingly, additional current is interrupted to suppress the generation of gas. If gas continues to be generated, the second notch 433a of the safety vent 430a is ruptured by the internal pressure, and so pressurized gas within the can 200a is drained through the gas exhaust holes 412a of the top cap 410a. Accordingly, the safety of the battery can be guaranteed.

In particular, the safety vent 430a can include the Z-shaped projected fitting unit 437a. As shown in FIG. 3, the Z-shaped projected fitting unit 437a functions to fix the CID 440a placed under the safety vent 430a. As will be described later, the CID 440a includes the engagement units 447a between the activator 446a and the support unit 448a. Accordingly, the Z-shaped projected fitting unit 437a of the safety vent 430a and the engagement units 447a of the CID 440a can be fitted together and fixed with the auxiliary gasket 510a interposed therebetween. It is preferred that the fitting state be a forced fitting state. This is because in the forced fitting state, the CID can be stably fixed to the safety vent although the central portion of the CID is separated from the main body of the CID.

FIG. 7 is a perspective view of the CID which is one of the elements of the cap assembly according to the present invention.

The CID 440a is formed of a circular conductive sheet material. The CID 440a functions to discharge gas within the battery and also interrupt current within the battery and is disposed under the safety vent 430a.

The CID 440a is formed of a circular metal sheet. The CID 440a includes the gas exhaust holes 442a and the central portion 444a formed at its central portion. The central portion 444a of the CID 440a is bonded with the projection portion 431a of the safety vent 430a. The CID 440a further includes the activator 446a and the support unit 448a which are integrated. The activator 446a has the notches formed on the concentric circle around the central portion 444a. The support unit 448a has an external diameter greater than the diameter of the activator and has a ring form over the activator. That is, the CID 440a includes the activator 446a (i.e., a lower circular sheet portion) and the support unit 448a configured to have an external diameter greater than the diameter of the activator and disposed over the activator. FIG. 8 shows a cross section of the CID.

The CID 440a includes the plurality of gas exhaust holes 442a formed on a lateral side and the central portion 444a formed at the center. The notches 443a are formed on the concentric circle around the central portion 444a. Three through holes and three notches 443a connecting the through holes are symmetrically formed on the concentric circle around the central portion 444a. When pressurized gas is applied to the safety vent 430a because of a rise in the pressure within the battery, the projection portion 431a of the safety vent 430a is lifted up, and the central portion 444a welded to the projection portion 431a is separated from the main body of the CID 440a as the notches 443a are cut away.

Figure 9:
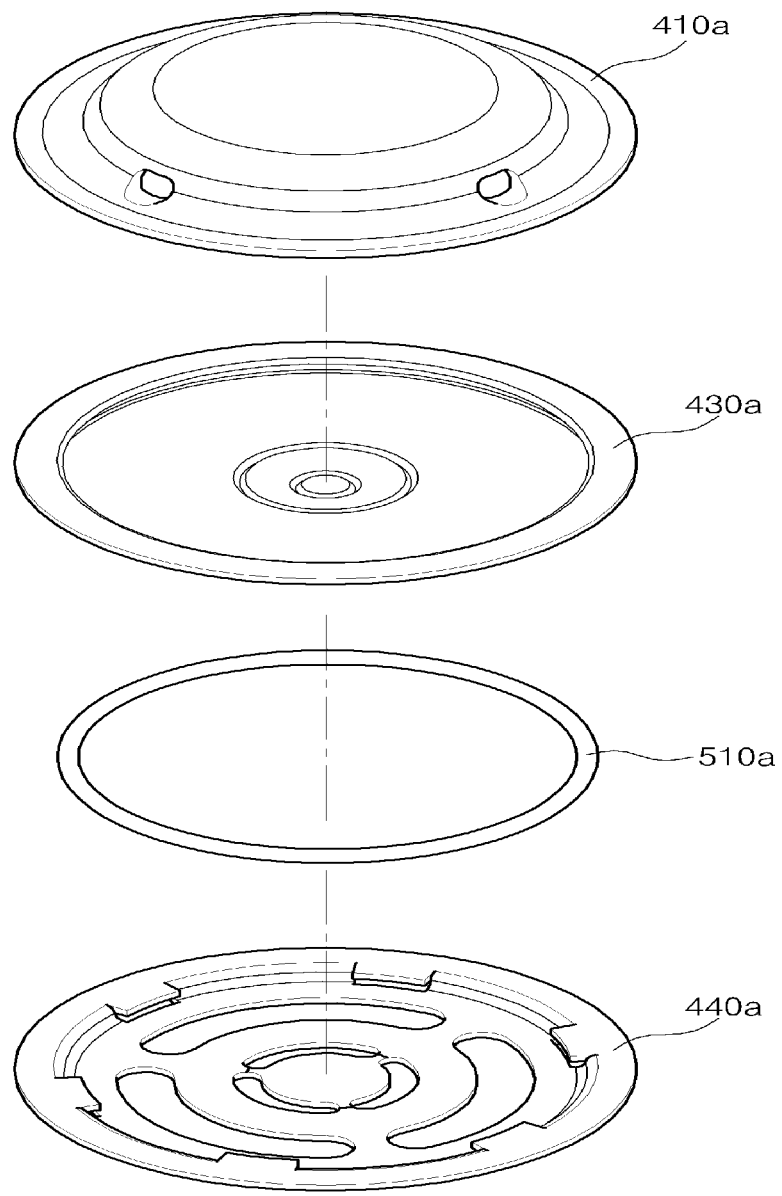
FIG. 9 is a diagram showing the coupling of the elements of the cap assembly according to the present invention.

FIG. 9 is a diagram showing the coupling of the elements of the cap assembly according to the present invention. As shown in FIG. 9, the cap assembly of the present invention can be fabricated in such a way as to insert the auxiliary gasket 510a into the CID 440a, forcibly fit the safety vent 430a thereon, and surround the outer circumference of a stack in which the PTC element and the top cap are sequentially stacked with the gasket.

Figure 1:
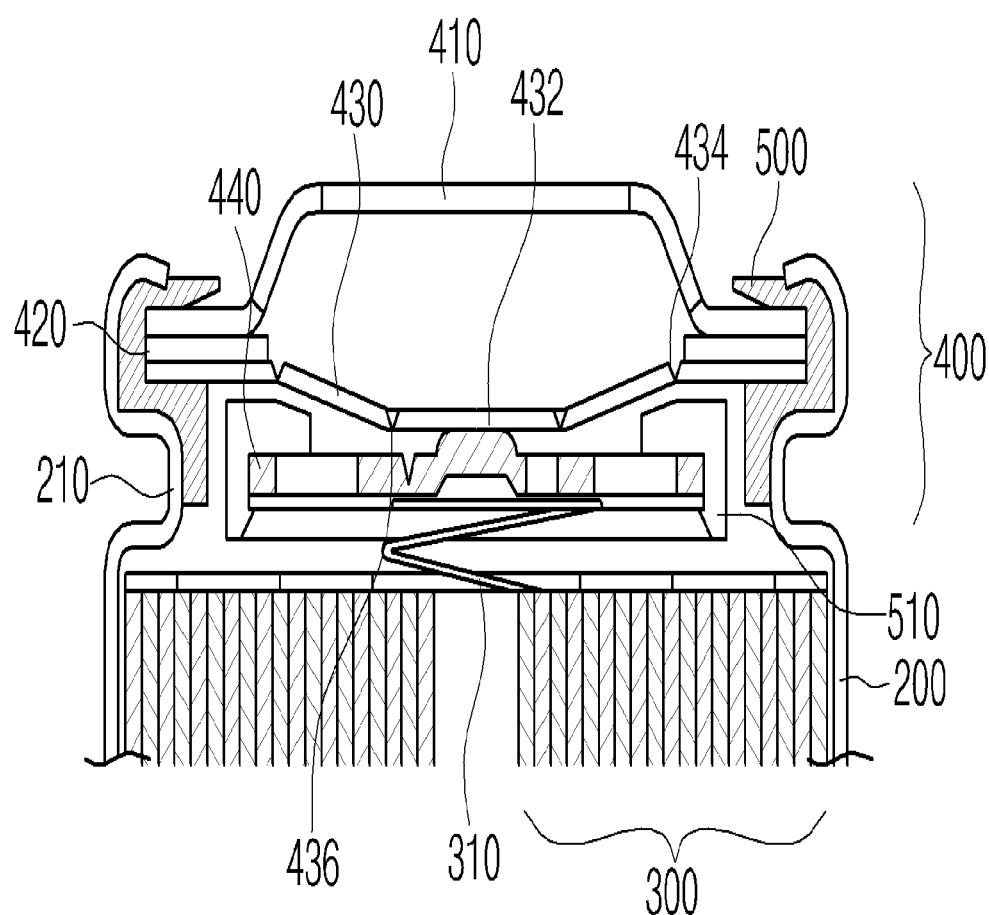
FIG. 1 is a cross-sectional view showing the upper structure of a conventional cylindrical secondary battery.

The structure of FIG. 9 is the same as the structure of FIG. 1 in that the top cap, the PTC element, and the safety vent are adhered closely together and then surrounded with the gasket, but different from the structure of FIG. 1 in that the safety vent and the CID are fixed in a fitting state with the auxiliary gasket interposed therebetween and the CID is seated in the inclined portion or the terraced portion of the gasket so that the electrolyte can be additionally sealed.

The dually sealed structure of the cap assembly according to the present invention is described below with reference to FIG. 10.

When the battery is in a normal state or normal operation condition, the electrolyte within the battery does not flow in the interface S1. However, when external force is applied or internal pressure rises, the sealing state of the cap assembly is released partially or temporarily, and so the electrolyte can flow in the interface S1. When the electrolyte within the battery flows in the interface S1 between the bottom surface of the safety vent 430a and the gasket 500a, the electrolyte can easily pass through the interface S2 between the safety vent 430a and the PTC element 420a, having a relatively low adhesion strength, or the interface S3 between the PTC element 420a and the top cap 410a and then leaks.

In the structure of the present invention, however, the electrolyte must pass through the interface S4 between the CID 440a and the gasket 500a before the electrolyte is exposed to the interface S1 between the safety vent 430a and the gasket 500a in order to provide a stronger sealing strength. In particular, although external force is applied, the battery is dropped, or internal pressure rises, the electrolyte within the battery rarely flows in the interface S2 between the safety vent 430a and the PTC element 420 and the interface S3 between the PTC element 420 and the top cap 410a.

The cylindrical secondary battery of the present invention includes the cap assembly of the present invention.

Any conventional technique and elements can be used as the remaining elements of the cylindrical secondary battery other than the cap assembly. The conventional technique and elements are widely known to a person having ordinary skill in the art, and a detailed description thereof is omitted.

EXPERIMENT EXAMPLE

Experiment for Checking Whether an Electrolyte Leaks Because of an Impulse

An experiment for checking whether an electrolyte leaked because of an impulse was performed in relation to the embodiment of the present invention. In a comparison example, the battery of the conventional assembly structure, such as that shown in FIG. 1, was used.

In the embodiment and the comparison example, the cylindrical battery had the same shape and size and also had the same capacity and voltage.

In an experiment condition, after the cylindrical battery was dropped on a concrete from the height of about 1.2 m, whether the electrolyte had leaked was checked. In relation to a direction in which the battery was dropped, three methods of dropping the battery with an upper portion (a portion in which the cap assembly was seated) directed downward; dropping the battery with the side of the battery directed downward; and dropping the battery with an upper portion of the battery directed upward were used.

Whether the electrolyte had leaked was checked using the three kinds of methods as one cycle. The experiment was carried out by 20 cycles in total, and the number of batteries used was 30 in each of the embodiment and the comparison example.

A result of the experiment was listed in Table 1 below.

TABLE 1

| COMPARISON EXAMPLE | EMBODIMENT |
| --- | --- |
| Leakage of electrolyte checked in 1 cycle (20/30) | Leakage of electrolyte not checked until 20 cycles (0/30) |

As shown in Table 1, the battery having the assembly structure of the present invention had no leakage of the electrolyte until 20 cycles. It can be understood that this result results from an excellent sealing strength because the assembly structure of the present invention is dually sealed for the electrolyte.

The cap assembly of the present invention is dually sealed in order to prevent the leakage of an electrolyte. Accordingly, there is an advantage in that the safety of the battery can be greatly improved because the electrolyte rarely leaks although the battery is shocked because of dropping.

While the invention has been shown and described with respect to the preferred embodiments, it will be understood by those skilled in the art that various changes and modifications may be made without departing from the spirit and scope of the invention as defined in the following claims.

What is claimed is:

1. A cap assembly, comprising:
   a top cap configured to include gas exhaust holes and form a projection terminal;
   a safety vent formed of a circular metal sheet and configured to have a projection portion formed at a center and two or more notches formed on a circle around the projection portion;
   a current interrupt device (CID) formed of a circular metal sheet and configured to have gas exhaust holes, a lower portion having a central portion bonded with the projection portion of the safety vent and an activator having notches formed around the central portion of the CID, and an upper portion having a support unit having an external diameter greater than a diameter of the activator and engagement units, the support unit having a ring shape; and a gasket configured to have an inclined portion or a terraced portion and to surround and seal an outer circumference of the CID, wherein the safety vent and the CID are fixed together in a fitting state with an auxiliary gasket interposed therebetween, wherein the support unit of the CID is seated in the inclined portion or the terraced portion of the gasket, wherein a bonding strength between an indentation central portion of the safety vent and the projection portion of the CID is greater than a rupture strength of each of all the notches formed in the safety vent and the CID, wherein the safety vent comprises a Z-shaped projected fitting unit, wherein the Z-shaped projected fitting unit of the safety vent and the engagement units of the CID are fitted and fixed together with the auxiliary gasket interposed therebetween, wherein each of the engagement units includes a through hole in which the fitting unit of the safety vent can be seated and a latch functioning to fix the auxiliary gasket and the fitting unit to the through hole, wherein the latch is located above the through hole and protrudes over the lower portion toward a center of the CID, and wherein the through hole is formed in an upwardly extending surface of the CID.

2. The cap assembly of claim 1, wherein a place where the support unit of the CID is seated in the gasket is within an area of a beading unit.

3. The cap assembly of claim 1, wherein the gas exhaust holes of the top cap and the gas exhaust holes of the CID are provided in an identical location from a viewpoint of an axial direction.

4. The cap assembly of claim 1, further comprising a positive temperature coefficient (PTC) element between the top cap and the safety vent.

5. The cap assembly of claim 1, wherein the support unit of the CID is seated in the inclined portion or the terraced portion of the gasket and so a battery is dually sealed for a leakage of an electrolyte.

6. A cylindrical secondary battery comprising a cap assembly according to claim 1.

7. A cylindrical secondary battery comprising a cap assembly according to claim 2.

8. A cylindrical secondary battery comprising a cap assembly according to claim 3.

9. A cylindrical secondary battery comprising a cap assembly according to claim 4.

10. A cylindrical secondary battery comprising a cap assembly according to claim 5.

11. A cylindrical secondary battery according to claim 6, further comprising:
a can having an open end; and
an electrode assembly disposed in the can,
wherein the cap assembly is connected to the open end of the can by crimping the can into contact with the cap assembly.

* * * * *